United States Patent
Oh et al.

(10) Patent No.: US 11,990,584 B2
(45) Date of Patent: May 21, 2024

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Energy Solution, Ltd., Seoul (KR)

(72) Inventors: Jeong Woo Oh, Daejeon (KR); Chul Haeng Lee, Daejeon (KR); Sung Guk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/801,407

(22) PCT Filed: Nov. 9, 2021

(86) PCT No.: PCT/KR2021/016209
§ 371 (c)(1),
(2) Date: Aug. 22, 2022

(87) PCT Pub. No.: WO2022/103112
PCT Pub. Date: May 19, 2022

(65) Prior Publication Data
US 2023/0100719 A1    Mar. 30, 2023

(30) Foreign Application Priority Data

Nov. 10, 2020  (KR) .................. 10-2020-0149269
Nov. 8, 2021   (KR) .................. 10-2021-0152275

(51) Int. Cl.
| | |
|---|---|
| *H01M 10/0567* | (2010.01) |
| *H01M 4/38* | (2006.01) |
| *H01M 4/40* | (2006.01) |
| *H01M 4/505* | (2010.01) |
| *H01M 4/525* | (2010.01) |
| *H01M 4/583* | (2010.01) |
| *H01M 10/0525* | (2010.01) |
| *H01M 10/0568* | (2010.01) |
| *H01M 50/46* | (2021.01) |
| *H01M 4/02* | (2006.01) |

(52) U.S. Cl.
CPC ....... *H01M 10/0567* (2013.01); *H01M 4/386* (2013.01); *H01M 4/405* (2013.01); *H01M 4/505* (2013.01); *H01M 4/525* (2013.01); *H01M 4/583* (2013.01); *H01M 10/0525* (2013.01); *H01M 10/0568* (2013.01); *H01M 50/46* (2021.01); *H01M 2004/027* (2013.01); *H01M 2004/028* (2013.01)

(58) Field of Classification Search
None
See application file for complete search history.

(56) References Cited

U.S. PATENT DOCUMENTS

| | | |
|---|---|---|
| 4,770,960 A | 9/1988 | Nagaura et al. |
| 2006/0046152 A1 | 3/2006 | Webber |
| 2006/0046153 A1 | 3/2006 | Webber |
| 2006/0046154 A1 | 3/2006 | Webber et al. |
| 2009/0061293 A1 | 3/2009 | Webber |
| 2010/0239917 A1 | 9/2010 | Lee et al. |
| 2010/0291424 A1 | 11/2010 | Webber |
| 2012/0107728 A1 | 5/2012 | Ryu et al. |
| 2012/0129046 A1 | 5/2012 | Utsumi |
| 2020/0157058 A1 | 5/2020 | Lee et al. |
| 2022/0140391 A1 | 5/2022 | Kim et al. |

FOREIGN PATENT DOCUMENTS

| | | |
|---|---|---|
| EP | 0243926 A1 | 11/1987 |
| JP | 2012113826 A | 6/2012 |
| JP | 2016046125 A | 4/2016 |
| KR | 20080067574 A | 7/2008 |
| KR | 20120045464 A | 5/2012 |
| KR | 20200056869 A | 5/2020 |
| KR | 20200105227 A | 9/2020 |

OTHER PUBLICATIONS

Niemi, T. et al., "A One-Pot Synthesis of N-Aryl-2-Oxazolidinones and Cyclic Urethanes by the Lewis Base Catalyzed Fixation of Carbon Dioxide into Anilines and Bromoalkanes" Chemistry a European, Journal Communication, Jun. 2016, pp. 10355-10359, vol. 22.
Chen, R. et al., "Novel Binary Room-Temperature Complex System Based on LiTFSI and 2-Oxazolidinone and its Characterization as Electrolyte" American Chemical Society, Jan. 2007, pp. 5184-5194, vol. 111.
International Search Report for Application No. PCT/KR2021/016209 dated Feb. 21, 2022, pp. 1-3.

*Primary Examiner* — Laura Weiner
(74) *Attorney, Agent, or Firm* — Lerner David LLP

(57) ABSTRACT

The present invention provides a non-aqueous electrolyte solution for a lithium secondary battery and a lithium secondary battery including the same. Specifically, since the non-aqueous electrolyte solution forms a robust solid electrolyte interphase (SEI) by including a lithium salt, an organic solvent, and a compound represented by Formula 1, the non-aqueous electrolyte solution for a lithium secondary battery may improve battery performance,

[Formula 1]

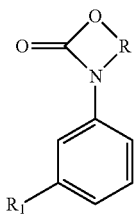

wherein, in Formula 1,
R and $R_1$ are described herein.

9 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national stage entry under 35 U.S.C. § 371 of International Application No. PCT/KR2021/016209 filed on Nov. 9, 2021, which claims priority from Korean Patent Application Nos. 10-2020-0149269 filed on Nov. 10, 2020, and 10-2021-0152275 filed on Nov. 8, 2021, all the disclosures of which are incorporated herein by reference.

TECHNICAL FIELD

The present invention relates to a non-aqueous electrolyte solution for a lithium secondary battery, which includes an additive capable of forming a robust solid electrolyte interphase (SEI), and a lithium secondary battery including the same.

BACKGROUND ART

There is a need to develop technology for efficiently storing and utilizing electrical energy as personal IT devices and computer networks are developed with the development of information society and the accompanying dependency of society as a whole on the electrical energy is increased.

Since a secondary battery may be miniaturized to be applicable to a personal IT device and may be applied to an electric vehicle and a power storage device, there emerges an interest in the secondary battery as the most suitable technology for various applications. Among these secondary batteries, a lithium-ion battery (LIB), which is a battery system having high energy density, is in the spotlight, and is currently being used in various devices.

The lithium-ion battery is generally composed of a positive electrode that includes a positive electrode active material formed of a transition metal oxide containing lithium, a negative electrode including a negative electrode active material capable of storing lithium ions, an electrolyte solution that becomes a medium for transferring lithium ions, and a separator.

Lithium, graphite, and silicon-based negative electrodes are representative active materials which are currently used in commercial lithium-ion batteries, wherein they express charge and discharge capacities through electrochemical oxidation/reduction reactions at 0.2 V and 0.5 V (vs. (Li/Li$^+$)) or less, respectively. However, since operating voltage ranges of the lithium, graphite, and silicon-based negative electrodes are lower than an electrochemical stability window of an organic electrolyte, the organic electrolyte becomes electrochemically unstable in these operating voltage ranges. As a result, while reductive decomposition of the electrolyte precedes, a passivation layer which is a reductive decomposition product of the electrolyte, that is, a solid electrolyte interphase (SEI) is formed on a surface of the electrode.

The SEI is a passivation layer with high lithium ion conductivity but low electron conductivity, wherein it not only suppresses additional reductive decomposition of the electrolyte, but also has a characteristic that enables operation of the lithium-ion battery because it has a characteristic that allows lithium ions to be transmitted but inhibits electron transmission.

However, since the SEI is damaged when exposed to high temperatures for a long time, passivation ability is lost, wherein, in this case, while additional electrolyte decomposition occurs, lithium and electrons in a cell are consumed to cause degradation of electrochemical performance of the cell, or an internal temperature of the cell is increased to cause a thermal runaway.

Thus, there is a need to develop a novel electrolyte composition capable of forming a robust passivation layer on surfaces of the negative electrode and the positive electrode.

DISCLOSURE OF THE INVENTION

Technical Problem

An aspect of the present invention provides a non-aqueous electrolyte solution for a lithium secondary battery which includes an additive capable of forming a robust passivation film on surfaces of a positive electrode and a negative electrode.

Another aspect of the present invention provides a lithium secondary battery including the non-aqueous electrolyte solution for a lithium secondary battery.

Technical Solution

According to an aspect of the present invention, there is provided a non-aqueous electrolyte solution for a lithium secondary battery which includes: a lithium salt, an organic solvent, and a compound represented by Formula 1.

[Formula 1]

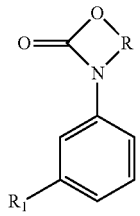

In Formula 1,
R is an alkylene group having 1 to 4 carbon atoms, and
$R_1$ is an alkyl group having 1 to 5 carbon atoms which is substituted with at least one fluorine.

According to another aspect of the present invention, there is provided a lithium secondary battery including: a positive electrode including a positive electrode active material; a negative electrode including a negative electrode active material; a separator disposed between the negative electrode and the positive electrode; and the non-aqueous electrolyte solution for a lithium secondary battery of the present invention.

Advantageous Effects

Since a non-aqueous electrolyte solution for a lithium secondary battery of the present invention includes a compound represented by Formula 1, which includes at least one nitrogen element and at least one fluorine element in its molecular structure, as an additive, a robust passivation film may be formed on a surface of a positive electrode or a negative electrode. Thus, a lithium secondary battery having improved high-temperature storage stability and high-temperature capacity characteristics may be achieved.

MODE FOR CARRYING OUT THE INVENTION

First, before describing the present invention, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terms used in the present specification are used to merely describe exemplary embodiments, but are not intended to limit the invention. The terms of a singular form may include plural forms unless referred to the contrary.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

In the present specification, the expression "%" denotes wt % unless explicitly stated otherwise.

Before describing the present invention, the expressions "a" and "b" in the description of "a to b carbon atoms" in the specification each denote the number of carbon atoms included in a specific functional group. That is, the functional group may include "a" to "b" carbon atoms.

Also, unless otherwise defined in the specification, the expression "substitution" denotes that at least one hydrogen bonded to carbon is substituted with an element other than hydrogen, for example, an alkyl group having 1 to 5 carbon atoms or a fluorine element.

Hereinafter, the present invention will be described in more detail.

Recently, as lithium-ion battery market expands, there is a need to develop a technique which may secure performance and stability of the battery in a higher temperature range (60° C. to 100° C.) than a typical high-temperature environment (45° C. to 60° C.). For example, with respect to a solid electrolyte interphase (SEI) which is a passivation film, passivation ability is maintained at 60° C., but it is disadvantageous in that the passivation ability is lost because it is thermally decomposed by itself at a high temperature of 85° C. or higher or is damaged by a material that is formed by thermal decomposition of a lithium salt. If the SEI is degraded, a film is formed (recovered) while additional reductive decomposition of an electrolyte occurs on an exposed surface of an electrode by receiving lithium and electrons from the electrode. This recovery process of the SEI continues until lithium and electrons in the electrode are completely consumed. As described above, if the damage and recovery of the SEI at high temperatures is continuously repeated, since a thickness of the film is gradually increased to cause an increase in polarization of a cell and serious degradation of charge-discharge capacity, electrochemical performance of the battery is degraded.

In order to improve this problem, the present invention aims at providing a non-aqueous electrolyte solution for a lithium secondary battery, which includes an additive capable of forming a stable film containing a nitrogen element and/or a fluorine element on surfaces of a positive electrode and a negative electrode, and a lithium secondary battery including the same.

Non-aqueous Electrolyte Solution for Lithium Secondary Battery

The present invention provides a non-aqueous electrolyte solution for a lithium secondary battery which includes a lithium salt, an organic solvent, and a compound represented by Formula 1 below.

[Formula 1]

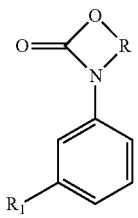

In Formula 1,

R is an alkylene group having 1 to 4 carbon atoms, and $R_1$ is an alkyl group having 1 to 5 carbon atoms which is substituted with at least one fluorine.

(1) Lithium Salt

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2(CF_3)_2CO^-$, $(CF_3SO_2)_2CH^-$, $CF_3(CF_2)_7SO_3^-$, and $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_4$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl)imide, $LiN(SO_2F)_2$), LiBETI (lithium bis(perfluoroethanesulfonyl)imide, $LiN(SO_2CF_2CF_3)_2$), and LiTFSI (lithium bis(trifluoromethanesulfonyl)imide, $LiN(SO_2CF_3)_2$) or a mixture of two or more thereof. In addition to them, a lithium salt typically used in an electrolyte solution of a lithium secondary battery may be used without limitation.

The lithium salt may be appropriately changed in a normally usable range, but may be included in a concentration of 0.8 M to 4.0 M, for example, 1.0 M to 3.0 M in the electrolyte solution to obtain an optimum effect of forming a film for preventing corrosion of the surface of the electrode.

If the concentration of the lithium salt is less than 0.8 M, since mobility of lithium ions is reduced, an effect of improving low-temperature output and cycle characteristics during high-temperature storage is insignificant, and, if the concentration of the lithium salt is greater than 4.0 M, non-aqueous electrolyte solution impregnability may be reduced due to an excessive increase in viscosity of the non-aqueous electrolyte solution, and the film-forming effect may be reduced.

(2) Organic Solvent

Various organic solvents typically used in a lithium electrolyte may be used as the organic solvent without limitation. For example, the organic solvent may include a cyclic carbonate-based organic solvent, a linear carbonate-based organic solvent, or a mixed organic solvent thereof.

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and, among them, the cyclic carbonate-based organic solvent may include at least one selected from ethylene carbonate (EC) and propylene carbonate (PC).

Also, the linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include ethyl methyl carbonate (EMC).

The cyclic carbonate organic solvent and the linear carbonate organic solvent may be included in a volume ratio of 1:9 to 5:5, for example, 2:8 to 3:7.

Furthermore, in order to prepare an electrolyte solution having high ionic conductivity, the organic solvent may further include a linear ester-based organic solvent and/or a cyclic ester-based organic solvent with a low melting point and high stability at high temperatures in addition to the cyclic carbonate-based organic solvent and/or the linear carbonate-based organic solvent.

As a representative example, the linear ester-based organic solvent may include at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one organic solvent selected from the group consisting of γ-butyrolactone, γ-valerolactone, γ-caprolactone, σ-valerolactone, and ε-caprolactone.

(3) First Additive

Also, the non-aqueous electrolyte solution for a lithium secondary battery of the present invention may include a compound represented by the following Formula 1 as a first additive.

[Formula 1]

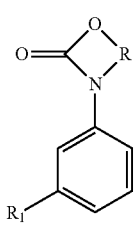

In Formula 1,

R is an alkylene group having 1 to 4 carbon atoms, and $R_1$ is an alkyl group having 1 to 5 carbon atoms which is substituted with at least one fluorine.

Specifically, in Formula 1, R may be an alkylene group having 2 to 4 carbon atoms, and $R_1$ may be an alkyl group having 1 to 4 carbon atoms which is substituted with at least one fluorine.

Also, in Formula 1, $R_1$ may be an alkyl group having 1 to 3 carbon atoms which is substituted with at least one fluorine.

Specifically, the compound represented by Formula 1 may be a compound represented by Formula 1a below.

[Formula 1a]

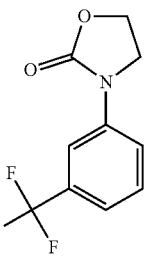

The compound represented by Formula 1 is a compound containing at least one nitrogen element and fluorine element in a single molecular structure, wherein it may form a nitrogen (N) atom and fluorine atom-based passivation film on the surfaces of the positive electrode and negative electrode while being electrochemically reductively decomposed. The nitrogen (N) atom and fluorine atom-based film has a characteristic in which it is not easily decomposed and maintained when the battery is exposed to high temperatures. Thus, if the non-aqueous electrolyte solution of the present invention including the compound represented by Formula 1 as the additive is used, a more robust passivation film may be formed on the surfaces of the positive electrode and negative electrode. As a result, since degradation of the passivation film due to the decomposition of the SEI at high temperature may be prevented, a negative electrode reduction reaction of additional transition metals may be controlled and electrodeposition of dissolved transition metal on the negative electrode during high-temperature storage may be prevented, and thus, a lithium secondary battery with improved high-temperature storage and cycle performance may be achieved.

Particularly, the compound represented by Formula 1 included as the electrolyte solution additive in the present invention may form a more stable LiF-containing film on the surface of the electrode by including a "fluorine-substituted alkyl group" which is a more excellent leaving group as a substituent of a benzene ring. In contrast, in a case in which a compound that does not contain a fluorine component in its structure, such as a compound represented by the following Formula 3, is used as the electrolyte solution additive, a stable LiF-containing film may not be formed. Also, in a case in which, as the electrolyte solution additive, a fluorine (F)-substituted compound having a relatively low desorption effect, such as a compound represented by the following formula 4, is used instead of the "fluorine-substituted alkyl group" on the benzene ring, since an effect of forming the LiF-containing film is relatively reduced, an effect of improving overall performance of the lithium secondary battery may be insignificant.

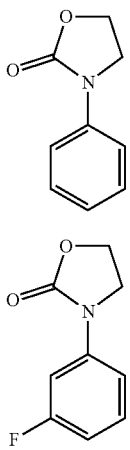

[Formula 3]

[Formula 4]

Furthermore, since the compound represented by Formula 1 included as the electrolyte solution additive in the present invention contains a nitrogen element in its structure, an SEI containing a nitrogen component may be formed on the surface of the electrode. Since the SEI has a better passivation performance than a film containing a $C_xH_yO_z$ (x, y, and z are each independently an integer of 1 to 3) component which is formed by a compound represented by the following Formula 2 that does not contain a nitrogen element in its structure, a more stable film may be formed.

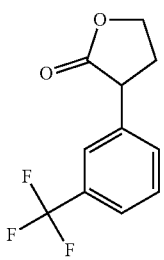

[Formula 2]

The compound represented by Formula 1 may be included in an amount of 0.01 wt % to 5 wt %, particularly 0.5 wt % to 5 wt %, and preferably 0.5 wt % to 3 wt % based on a total weight of the non-aqueous electrolyte solution for a lithium secondary battery.

In a case in which the amount of the compound represented by Formula 1 satisfies the above range, the dissolution of the transition metal of a positive electrode active material at high temperatures may be effectively suppressed by forming a robust film on the surface of the electrode, particularly the positive electrode, while reducing disadvantages, such as a side reaction due to the additive, a reduction in capacity, and an increase in resistance, as much as possible, and excellent high-temperature durability may be achieved by effectively scavenging a thermal decomposition product of the lithium salt.

If the amount of the compound represented by Formula 1 is less than 0.01 wt %, the thermal decomposition product of the lithium salt may be initially scavenged during operation, but the scavenging effect may be insignificant as operation time increases, and the effect of suppressing the dissolution of the transition metal may be reduced due to the insignificant effect of forming a film on the surface of the positive electrode. Also, if the amount of the compound represented by Formula 1 is greater than 5 wt %, a by-product and a side reaction due to the excessive amount of the additive may occur.

(4) Other Additives

Also, the non-aqueous electrolyte solution for a lithium secondary battery of the present invention may further include additional other additives in addition to the compound represented by Formula 1, if necessary, in order to prevent the occurrence of collapse of the negative electrode due to the decomposition of the non-aqueous electrolyte solution in a high power environment or to further improve low-temperature high rate discharge characteristics, high-temperature stability, overcharge prevention, and an effect of suppressing battery swelling at high temperature.

Examples of the other additives may be at least one selected from the group consisting of a halogen-unsubstituted or substituted carbonate-based compound, a sultone-based compound, a sulfate-based compound, a phosphate-based or phosphite-based compound, a borate-based compound, a nitrile-based compound, a benzene-based compound, an amine-based compound, a silane-based compound, and a lithium salt-based compound.

The halogen-unsubstituted or substituted carbonate-based compound, for example, may be vinylene carbonate (VC), vinylethylene carbonate, or fluoroethylene carbonate (FEC).

The sultone-based compound, for example, may be at least one compound selected from the group consisting of 1,3-propane sultone (PS), 1,4-butane sultone, ethane sultone, 1,3-propene sultone (PRS), 1,4-butene sultone, and 1-methyl-1,3-propene sultone.

The sulfate-based compound, for example, may be ethylene sulfate (Esa), trimethylene sulfate (TMS), or methyl trimethylene sulfate (MTMS).

The phosphate-based or phosphite-based compound, for example, may be at least one compound selected from the group consisting of lithium difluoro(bisoxalato)phosphate, lithium difluorophosphate, tris(trimethylsilyl)phosphate, trimethylsilyl phosphite, tris(2,2,2-trifluoroethyl)phosphate, and tris(trifluoroethyl)phosphite.

The borate-based compound may include tetraphenylborate, lithium oxalyldifluoroborate (LiODFB), or lithium bisoxalatoborate ($LiB(C_2O_4)_2$; LiBOB).

The nitrile-based compound, for example, may be at least one compound selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The benzene-based compound may be fluorobenzene, the amine-based compound may be triethanolamine or ethylene diamine, and the silane-based compound may be tetravinylsilane.

The lithium salt-based compound is a compound different from the lithium salt included in the non-aqueous electrolyte solution, wherein the lithium salt-based compound may include $LiPO_2F_2$ or $LiBF_4$.

In a case in which vinylene carbonate, vinylethylene carbonate, or succinonitrile, among these other additives, is included, a more robust SEI may be formed on the surface of the negative electrode during an initial activation process of the secondary battery.

In a case in which the $LiBF_4$ is included, high-temperature stability of the secondary battery may be improved by suppressing the generation of gas which may be generated due to the decomposition of the electrolyte solution during high-temperature storage.

Two or more compounds may be mixed and used as the other additives, and the other additives may be included in an amount of 0.01 wt % to 50 wt %, particularly 0.05 wt % to 10 wt %, and preferably 0.1 wt % to 5 wt % based on the total weight of the non-aqueous electrolyte solution. If the amount of the other additives is less than 0.01 wt %, an effect of improving low-temperature output, high-temperature storage characteristics, and high-temperature life characteristics of the battery is insignificant, and, if the amount of the other additives is greater than 50 wt %, a side reaction may excessively occur during charge and discharge of the battery due to the excessive amount of the additives. Particularly, when the excessive amount of the other additives is added, the additives may not be sufficiently decomposed at high temperature so that an unreacted material is formed in the electrolyte solution at room temperature or they may be present in the form of precipitates. Accordingly, a side reaction that degrades life or resistance characteristics of the secondary battery may occur.

Lithium Secondary Battery

Next, a lithium secondary battery according to the present invention will be described.

The lithium secondary battery according to the present invention includes a positive electrode, a negative electrode, a separator disposed between the positive electrode and the negative electrode, and a non-aqueous electrolyte solution, and, in this case, the non-aqueous electrolyte solution is the non-aqueous electrolyte solution according to the present invention. Since the non-aqueous electrolyte solution has been described above, a description thereof will be omitted and other components will be described below.

(1) Positive Electrode

The positive electrode according to the present invention may include a positive electrode active material layer including a positive electrode active material, and, if necessary, the positive electrode active material layer may further include a conductive agent and/or a binder.

The positive electrode active material is a compound capable of reversibly intercalating and deintercalating lithium, wherein the positive electrode active material may specifically include a lithium composite metal oxide including lithium and at least one metal selected from the group consisting of nickel (Ni), cobalt (Co), manganese (Mn), iron (Fe), and aluminum (Al), and may particularly include a high-nickel (Ni) lithium composite metal oxide in which a Ni content is high at 0.55 or more.

With respect to the lithium composite metal oxide having a high Ni content, despite the advantage of being able to achieve a high-capacity battery, there has been a problem in that $Ni^{2+}$ cations are dissolved from the positive electrode into the electrolyte, the $Ni^{2+}$ cations react with a passivation film (SEI) of the negative electrode to decompose the SEI, and, as a result, since a portion of the negative electrode active material is exposed to the electrolyte to cause a side reaction, capacity and life characteristics are degraded and resistance is increased. Thus, with respect to the lithium composite metal oxide having a high Ni content, despite the advantage of being able to achieve a high-capacity battery, the life characteristics of the battery may be degraded and the resistance may be increased. Also, with respect to the high-Ni positive electrode active material, the dissolution of the transition metal may be intensified by acceleration of structural collapse of the positive electrode due to high-temperature exposure, and may be accelerated particularly when HF is present in the electrolyte.

Thus, in order to solve this problem, the lithium secondary battery of the present invention employed the non-aqueous electrolyte solution containing the compound represented by Formula 1 as an additive. Due to the additive of the compound, stabilization of the film on the surface of the positive electrode may not only be improved, but also a Lewis acid in the non-aqueous electrolyte solution may be scavenged to prevent degradation of the film. Therefore, degradation of high-temperature durability, high-temperature capacity, and life characteristics of the lithium secondary battery may be prevented.

Typical examples of the lithium composite metal oxide may be $Li(Ni_{0.6}Mn_{0.2}Co_{0.2})O_2$, $Li(Ni_{0.7}Mn_{0.20}Co_{0.10})O_2$, $Li(Ni_{0.8}Mn_{0.1}Co_{0.1})O_2$, $Li[Ni_{0.8}Co_{0.15}Al_{0.05}]O_2$, $Li[Ni_{0.86}Mn_{0.07}Co_{0.05}Al_{0.02}]O_2$, or $Li(Ni_{0.9}Mn_{0.05}Co_{0.05})O_2$.

Also, in addition to the above-described lithium composite metal oxide, the positive electrode active material may further include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), if necessary.

The positive electrode active material may be included in an amount of 80 wt % to 98 wt %, for example, 85 wt % to 98 wt % based on a total weight of the positive electrode active material layer. When the positive electrode active material is included in an amount within the above range, excellent capacity characteristics may be exhibited.

Next, the conductive agent is used to provide conductivity to the electrode, wherein any conductive agent may be used without particular limitation as long as it has suitable electron conductivity without causing adverse chemical changes in the battery.

As a specific example of the conductive agent, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent may be included in an amount of 0.1 wt % to 10 wt %, for example, 0.1 wt % to 5 wt % based on the total weight of the positive electrode active material layer.

Next, the binder improves the adhesion between positive electrode active material particles and the adhesion between the positive electrode active material and a current collector.

Specific examples of the binder may be a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The binder may be included in an amount of 0.1 wt % to 15 wt %, for example, 0.1 wt % to 10 wt % based on the total weight of the positive electrode active material layer.

The positive electrode of the present invention as described above may be prepared by a method of preparing a positive electrode which is known in the art. For example, the positive electrode may be prepared by a method in which a positive electrode collector is coated with a positive electrode slurry, which is prepared by dissolving or dispersing the positive electrode active material, the binder, and/or the conductive agent in a solvent, dried, and then rolled, or a method in which the positive electrode slurry is cast on a separate support and a film separated from the support is then laminated on the positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode material. The positive electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if a positive electrode material mixture may be adjusted to have appropriate viscosity in consideration of a coating thickness of the positive electrode material mixture, manufacturing yield, and workability, and is not particularly limited.

(2) Negative Electrode

Next, a negative electrode will be described.

The negative electrode according to the present invention includes a negative electrode active material layer including a negative electrode active material, and the negative electrode active material layer may further include a conductive agent and/or a binder, if necessary.

Various negative electrode active materials used in the art, for example, a carbon-based negative electrode active material, a silicon-based negative electrode active material, or a mixture thereof may be used as the negative electrode active material.

According to an embodiment, the negative electrode active material may include a carbon-based negative electrode active material, and, as the carbon-based negative electrode active material, various carbon-based negative electrode active materials used in the art, for example, a graphite-based materials such as natural graphite, artificial graphite, and Kish graphite; pyrolytic carbon, mesophase pitch based carbon fiber, meso-carbon microbeads, mesophase pitches, high-temperature sintered carbon such as petroleum or coal tar pitch derived cokes, soft carbon, and hard carbon may be used. A shape of the carbon-based negative electrode active material is not particularly limited, and materials of various shapes, such as an irregular shape, planar shape, flaky shape, spherical shape, or fibrous shape, may be used.

Preferably, the carbon-based negative electrode active material may include at least one of natural graphite and artificial graphite. More preferably, the carbon-based negative electrode active material may include natural graphite and artificial graphite. In a case in which the natural graphite and the artificial graphite are used together, adhesion with the current collector may be increased to suppress exfoliation of the active material.

According to another embodiment, the negative electrode active material may include a carbon-based negative electrode active material and a silicon-based negative electrode active material.

Specific examples of the carbon-based negative electrode active material are the same as described above.

The silicon-based negative electrode active material, for example, may include at least one selected from the group consisting of metallic silicon (Si), silicon oxide ($SiO_x$, where $0<x<2$), silicon carbide (SiC), and a Si—Y alloy (where Y is an element selected from the group consisting of alkali metal, alkaline earth metal, a Group 13 element, a Group 14 element, transition metal, a rare earth element, and a combination thereof, and is not Si). The element Y may be selected from the group consisting of Mg, calcium (Ca), strontium (Sr), barium (Ba), radium (Ra), scandium (Sc), yttrium (Y), Ti, zirconium (Zr), hafnium (Hf), rutherfordium (Rf), V, niobium (Nb), Ta, dubnium (db), Cr, Mo, tungsten (W), seaborgium (Sg), technetium (Tc), rhenium (Re), bohrium (Bh), Fe, lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), Al, gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and a combination thereof.

Since the silicon-based negative electrode active material has higher capacity characteristics than the carbon-based negative electrode active material, better capacity characteristics may be obtained when the silicon-based negative electrode active material is further included. However, with respect to a negative electrode including the silicon-based negative electrode active material, it contains more oxygen (O)-rich (O-rich) components in the SEI than a graphite negative electrode, and the SEI containing the O-rich components tends to be more easily decomposed when a Lewis acid, such as HF or $PF_5$, is present in the electrolyte solution. Thus, with respect to the negative electrode including the silicon-based negative electrode active material, there is a need to suppress the formation of the Lewis acid, such as HF and $PF_5$, in the electrolyte solution or remove (or scavenge) the formed Lewis acid in order to stably maintain the SEI. Since the non-aqueous electrolyte solution according to the present invention includes the electrolyte solution additive capable of forming a stable film on the positive electrode and the negative electrode, it may effectively suppress the decomposition of the SEI when the negative electrode including the silicon-based negative electrode active material is used.

A mixing ratio of the silicon-based negative electrode active material: the carbon-based negative electrode active material may be in a range of 3:97 to 99:1, for example, 5:95 to 15:85, as a weight ratio. In a case in which the mixing ratio of the silicon-based negative electrode active material to the carbon-based negative electrode active material satisfies the above range, since a volume expansion of the silicon-based negative electrode active material is suppressed while capacity characteristics are improved, excellent cycle performance may be secured.

The negative electrode active material may be included in an amount of 80 wt % to 99 wt % based on a total weight of the negative electrode active material layer. In a case in which the amount of the negative electrode active material satisfies the above range, excellent capacity characteristics and electrochemical properties may be obtained.

Next, the conductive agent is a component for further improving conductivity of the negative electrode active material, wherein any conductive agent may be used without particular limitation so long as it has conductivity without causing adverse chemical changes in the battery, and the conductive agent may be the same as or different from that used during the preparation of the positive electrode. Specifically, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used as the conductive agent.

The conductive agent may be added in an amount of 10 wt % or less, for example, 5 wt % or less based on the total weight of the negative electrode active material layer.

The binder is a component that assists in the binding between the conductive agent, the active material, and the current collector, wherein the binder may be the same as or different from that used during the preparation of the positive electrode. Specifically, the binder may include a fluorine resin-based binder including polyvinylidene fluoride (PVDF) or polytetrafluoroethylene (PTFE); a rubber-based binder including a styrene butadiene rubber (SBR), an acrylonitrile-butadiene rubber, or a styrene-isoprene rubber; a cellulose-based binder including carboxymethylcellulose (CMC), starch, hydroxypropylcellulose, or regenerated cellulose; a polyalcohol-based binder including polyvinyl alcohol; a polyolefin-based binder including polyethylene or polypropylene; a polyimide-based binder; a polyester-based binder; and a silane-based binder.

The binder may be added in an amount of 0.1 wt % to 10 wt % based on the total weight of the negative electrode active material layer.

The negative electrode may be prepared by a method of preparing a negative electrode which is known in the art. For example, the negative electrode may be prepared by a method in which a negative electrode collector is coated with a negative electrode slurry, which is prepared by dissolving or dispersing the negative electrode active material as well as optionally the binder and the conductive agent in a solvent, rolled and dried, or may be prepared by casting the negative electrode slurry on a separate support and then laminating a film separated from the support on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, or an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The solvent may be a solvent normally used in the art, and may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the negative electrode slurry may be adjusted to have appropriate viscosity in consideration of a coating thickness of a negative electrode material mixture, manufacturing yield, and workability, and is not particularly limited.

(3) Separator

The lithium secondary battery according to the present invention includes a separator between the positive electrode and the negative electrode.

The separator separates the negative electrode and the positive electrode and provides a movement path of lithium ions, wherein any separator may be used without particular limitation as long as it is typically used as a separator in a lithium secondary battery, and particularly, a separator having high moisture-retention ability for an electrolyte solution as well as low resistance to the transfer of electrolyte ions may be used.

Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be optionally used.

The lithium secondary battery according to the present invention as described above may be suitably used in portable devices, such as mobile phones, notebook computers, and digital cameras, and electric cars such as a hybrid electric vehicle (HEV).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples.

EXAMPLES

Example 1

(Non-Aqueous Electrolyte Solution Preparation)

After $LiPF_6$ was dissolved in 99.9 g of a non-aqueous organic solvent, in which ethylene carbonate (EC) and ethyl methyl carbonate (EMC) were mixed in a volume ratio of 30:70, such that a concentration of the $LiPF_6$ was 1.0 M, a non-aqueous electrolyte solution for a lithium secondary battery of the present invention was prepared by adding 0.1 g of the compound represented by Formula 1a.

(Positive Electrode Preparation)

A lithium nickel-manganese-aluminum oxide (Li($Ni_{0.86}Mn_{0.07}Co_{0.05}Al_{0.02}$)$O_2$) as positive electrode active material particles, carbon black as a conductive agent, and polyvinylidene fluoride (PVDF), as a binder, (weight ratio of 90:5:5) were added to N-methyl-2-pyrrolidone (NMP), as a solvent, to prepare a positive electrode active material slurry (solid content 48 wt %). A 100 μm thick positive electrode collector (Al thin film) was coated with the positive electrode active material slurry, dried, and then roll-pressed to prepare a positive electrode.

(Negative Electrode Preparation)

A negative electrode active material (artificial graphite: SiO=94.5:5.5 weight ratio), PVDF as a binder, and carbon black, as a conductive agent, were added to NMP, as a solvent, at a weight ratio of 95:2:3 to prepare a negative electrode active material slurry (solid content: 70 wt %). A 90 μm thick negative electrode collector (Cu thin film) was coated with the negative electrode active material slurry, dried, and then roll-pressed to prepare a negative electrode.

(Secondary Battery Preparation)

After an electrode assembly was prepared by a conventional method of sequentially stacking a polyethylene porous film with the positive electrode and negative electrode prepared by the above-described methods, the electrode assembly was put in a pouch-type secondary battery case, and the above-prepared non-aqueous electrolyte solution for a lithium secondary battery was injected thereinto to prepare a lithium secondary battery.

Example 2

A lithium secondary battery was prepared in the same manner as in Example 1 except that, after $LiPF_6$ was dissolved in 99.5 g of a non-aqueous organic solvent such that a concentration of the $LiPF_6$ was 1.0 M, a non-aqueous electrolyte solution for a lithium secondary battery of the present invention was prepared by adding 0.5 g of the compound represented by Formula 1a.

Example 3

A lithium secondary battery was prepared in the same manner as in Example 1 except that, after $LiPF_6$ was dissolved in 99 g of a non-aqueous organic solvent such that a concentration of the $LiPF_6$ was 1.0 M, a non-aqueous electrolyte solution for a lithium secondary battery of the present invention was prepared by adding 1.0 g of the compound represented by Formula 1a.

Example 4

A lithium secondary battery was prepared in the same manner as in Example 1 except that, after $LiPF_6$ was dissolved in 98.5 g of a non-aqueous organic solvent such that a concentration of the $LiPF_6$ was 1.0 M, a non-aqueous electrolyte solution for a lithium secondary battery of the present invention was prepared by adding 1.5 g of the compound represented by Formula 1a.

Example 5

A lithium secondary battery was prepared in the same manner as in Example 1 except that, after $LiPF_6$ was dissolved in 98 g of a non-aqueous organic solvent such that a concentration of the $LiPF_6$ was 1.0 M, a non-aqueous electrolyte solution for a lithium secondary battery of the present invention was prepared by adding 2.0 g of the compound represented by Formula 1a.

Example 6

A lithium secondary battery was prepared in the same manner as in Example 1 except that, after $LiPF_6$ was dissolved in 97 g of a non-aqueous organic solvent such that a concentration of the $LiPF_6$ was 1.0 M, a non-aqueous electrolyte solution for a lithium secondary battery of the present invention was prepared by adding 3.0 g of the compound represented by Formula 1a.

Example 7

A lithium secondary battery was prepared in the same manner as in Example 1 except that, after $LiPF_6$ was dissolved in 93 g of a non-aqueous organic solvent such that a concentration of the $LiPF_6$ was 1.0 M, a non-aqueous electrolyte solution for a lithium secondary battery of the present invention was prepared by adding 7.0 g of the compound represented by Formula 1a.

Comparative Example 1

A lithium secondary battery was prepared in the same manner as in Example 1 except that an additive was not included in a non-aqueous organic solvent.

Comparative Example 2

A lithium secondary battery was prepared in the same manner as in Example 1 except that a non-aqueous electrolyte solution was prepared by adding a compound of the following Formula 2, instead of the compound represented by Formula 1a, as an additive.

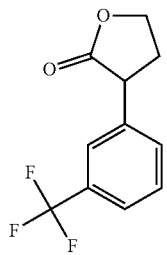

[Formula 2]

Comparative Example 3

A lithium secondary battery was prepared in the same manner as in Example 1 except that a non-aqueous electrolyte solution was prepared by adding a compound represented by the following Formula 3, instead of the compound represented by Formula 1a, as an additive.

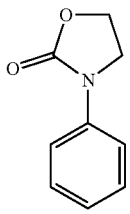

[Formula 3]

Comparative Example 4

A lithium secondary battery was prepared in the same manner as in Example 1 except that a non-aqueous electrolyte solution was prepared by adding a compound represented by the following Formula 4, instead of the compound represented by Formula 1a, as an additive.

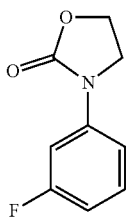

[Formula 4]

EXPERIMENTAL EXAMPLES

Experimental Example 1: Evaluation of Capacity Retention and Resistance Increase Rate at High Temperature (45° C.)

After formation was performed at a current of 200 mA (0.1 C rate) on the lithium secondary batteries prepared in Examples 1 to 7 and the lithium secondary batteries prepared in Comparative Examples 1 to 4, discharge capacity in this case was set as initial capacity, and resistance measured was set as initial resistance.

Then, after constant current/constant voltage (CC/CV) charging at 660 mA (0.33 C, 0.05 C cut-off) to 4.2 V and CC discharging at 660 mA (0.33 C) to 2.5 V were set as one cycle to perform 200 cycles at a high temperature (45° C.), discharge capacity and resistance were measured.

After a capacity retention was calculated by comparing discharge capacity after 200 cycles and the initial capacity and a resistance increase rate was calculated by comparing resistance after 200 cycles and the initial resistance, the results thereof are presented in Table 1 below.

TABLE 1

| | Additive | | Capacity retention (%) | Resistance increase rate (%) |
|---|---|---|---|---|
| | Formula | Amount (wt %) | | |
| Example 1 | 1a | 0.1 | 98.0 | 3.5 |
| Example 2 | 1a | 0.5 | 98.7 | 3.0 |
| Example 3 | 1a | 1.0 | 98.2 | 3.2 |
| Example 4 | 1a | 1.5 | 97.6 | 3.5 |
| Example 5 | 1a | 2.0 | 97.1 | 4.7 |
| Example 6 | 1a | 3.0 | 96.8 | 5.5 |
| Example 7 | 1a | 7.0 | 92.5 | 10.5 |
| Comparative Example 1 | — | 0 | 82.4 | 25.4 |
| Comparative Example 2 | 2 | 0.1 | 85.3 | 22.9 |
| Comparative Example 3 | 3 | 0.1 | 90.1 | 21.2 |
| Comparative Example 4 | 4 | 0.1 | 92.1 | 15.4 |

Referring to Table 1, with respect to the lithium secondary batteries of Examples 1 to 7 of the present invention, it may be understood that both capacity retention and resistance increase rate were improved even after 200 cycles at a high temperature in comparison to those of the secondary battery of Comparative Example 1 including the non-aqueous organic solvent containing no additive, the secondary battery of Comparative Example 2 including the non-aqueous electrolyte solution containing the compound of Formula 2 as an additive, and the secondary batteries of Comparative Examples 3 and 4 including the non-aqueous electrolyte solution containing the compound of Formula 3 or 4 as an additive. In this case, with respect to the secondary battery of Comparative Example 1 including the non-aqueous organic solvent containing no additive, it may be understood that the solvent, such as ethylene carbonate (EC), was reductively decomposed, and, as a result, while lithium ion transfer ability was reduced, a resistance value was increased in comparison to those of the lithium secondary batteries of Examples 1 to 7.

Experimental Example 2: High-Temperature (45° C.) Storage Characteristics Evaluation Discharge capacity, after each of the lithium secondary batteries prepared in Examples 1 to 7 and the lithium secondary batteries prepared in Comparative Examples 1 to 4 was charged at 0.33 C rate to 4.2 V under a constant current/constant voltage condition, 0.05 C cut-off charged, and discharged at 0.33 C to 2.5 V, was set as initial capacity, and resistance in this case was set as initial resistance.

Then, residual capacity and resistance, after each lithium secondary was charged at 0.33 C rate to 4.2 V under a constant current/constant voltage condition, 0.05 C cut-off charged, and stored at 60° C. for 10 weeks, were measured. After a capacity retention was calculated by comparing the discharge capacity measured after 10 weeks of storage at high temperature and the initial capacity and a resistance increase rate was calculated by comparing the resistance measured after 10 weeks of storage at high temperature and the initial resistance, the results thereof are presented in Table 2 below.

TABLE 2

| | Additive | | Capacity retention (%) | Resistance increase rate (%) |
|---|---|---|---|---|
| | Formula | Amount (wt %) | | |
| Example 1 | 1a | 0.1 | 96.2 | 5.1 |
| Example 2 | 1a | 0.5 | 97.1 | 4.5 |
| Example 3 | 1a | 1.0 | 96.5 | 4.7 |
| Example 4 | 1a | 1.5 | 95.7 | 5.5 |
| Example 5 | 1a | 2.0 | 94.5 | 6.1 |
| Example 6 | 1a | 3.0 | 94.2 | 6.9 |
| Example 7 | 1a | 7.0 | 90.1 | 15.4 |
| Comparative Example 1 | — | 0 | 78.4 | 35.4 |
| Comparative Example 2 | 2 | 0.1 | 82.3 | 30.9 |
| Comparative Example 3 | 3 | 0.1 | 88.1 | 28.8 |
| Comparative Example 4 | 4 | 0.1 | 89.8 | 20.2 |

Referring to Table 2, with respect to the lithium secondary batteries of Examples 1 to 7 of the present invention, it may be understood that both capacity retention and resistance increase rate after high-temperature storage were improved in comparison to those of the secondary battery of Comparative Example 1 including the non-aqueous organic solvent containing no additive, the secondary battery of Comparative Example 2 including the non-aqueous electrolyte solution containing the compound of Formula 2 as an additive, and the secondary batteries of Comparative Examples 3 and 4 including the non-aqueous electrolyte solution containing the compound of Formula 3 or 4 as an additive. That is, with respect to the secondary battery of Comparative Example 1 including the non-aqueous organic solvent containing no additive, it may be understood that the solvent, such as ethylene carbonate (EC), was reductively decomposed, and, as a result, while the lithium ion transfer ability was reduced, a resistance value was increased in comparison to those of the lithium secondary batteries of Examples 1 to 7.

Experimental Example 3: Evaluation of Voltage Drop Rate (%) after High-Temperature Storage After each of the lithium secondary batteries prepared in Examples 1 to 7 and the lithium secondary batteries prepared in Comparative Examples 1 to 4 was charged at 0.33 C rate to 4.2 V under a constant current/constant voltage condition at room temperature (25° C.) and fully charged (state of charge (SOC) 100%) to a cut-off current of 50 mA, an initial voltage (4.2 V) before high-temperature storage was measured using PNE-0506 charge/discharge equipment (manufacturer: PNE solution).

Subsequently, after each lithium secondary battery was stored at a high temperature of 72° C. for 60 days, a voltage drop rate (%) was evaluated. The voltage drop rate (%) was calculated according to the following [Equation 1]. Measurement results are listed in Table 3 below.

Voltage drop rate(%)={(voltage after 60 days−initial voltage)/initial voltage}×100  [Equation 1]

TABLE 3

| | Additive | | Voltage after 60 days | Voltage drop rate (%) |
|---|---|---|---|---|
| | Formula | Amount (wt %) | | |
| Example 1 | 1a | 0.1 | 4.05 | 3.57 |
| Example 2 | 1a | 0.5 | 4.07 | 3.09 |
| Example 3 | 1a | 1.0 | 4.10 | 2.38 |
| Example 4 | 1a | 1.5 | 4.11 | 2.14 |
| Example 5 | 1a | 2.0 | 4.14 | 1.43 |
| Example 6 | 1a | 3.0 | 4.17 | 0.07 |
| Example 7 | 1a | 7.0 | 4.01 | 4.52 |
| Comparative Example 1 | — | 0 | 3.85 | 8.33 |
| Comparative Example 2 | 2 | 0.1 | 3.90 | 7.14 |
| Comparative Example 3 | 3 | 0.1 | 3.92 | 6.67 |
| Comparative Example 4 | 4 | 0.1 | 3.98 | 5.12 |

The expression "voltage drop" denotes a phenomenon in which, when transition metal dissolved from a positive electrode consumes electrons while being reduced at a negative electrode side or when a film (SEI) is not properly formed on a negative electrode, an electrolyte solution increases a voltage of the negative electrode while being easily reductively decomposed to drop a voltage of a full cell.

Referring to Table 3, the lithium secondary batteries of Examples 1 to 6 of the present invention had a voltage drop rate (%) after storage at 72° C. for 60 days of about 3.57% or less, wherein it may be understood that the voltage drop rate (%) was improved in comparison to that of the secondary battery of Comparative Example 1 including the non-aqueous organic solvent containing no additive, the secondary battery of Comparative Example 2 including the non-aqueous electrolyte solution containing the compound of Formula 2 as an additive, and the secondary batteries of Comparative Examples 3 and 4 including the non-aqueous electrolyte solution containing the compound of Formula 3 or 4 as an additive. It may be understood that the lithium secondary battery of Example 7 had a higher voltage drop rate (%) after storage at 72° C. for 60 days than those of the lithium secondary batteries of Examples 1 to 6 due to an increase in resistance caused by the use of the excessive amount of the additive.

The invention claimed is:

1. A non-aqueous electrolyte solution for a lithium secondary battery, the non-aqueous electrolyte solution comprising: a lithium salt, an organic solvent, and a compound represented by Formula 1 as an additive,

[Formula 1]

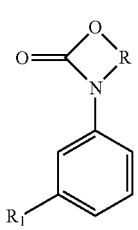

wherein, in Formula 1,
R is an alkylene group having 1 to 4 carbon atoms, and
$R_1$ is an alkyl group having 1 to 5 carbon atoms which is substituted with at least one fluorine, wherein the compound represented by Formula 1 is included in an amount of 0.01 wt % to 5 wt % based on a total weight of the non-aqueous electrolyte solution.

2. The non-aqueous electrolyte solution for a lithium secondary battery of claim 1, wherein the compound represented by Formula 1 is a compound represented by Formula 1a,

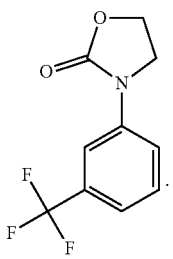

[Formula 1a]

3. The non-aqueous electrolyte solution for a lithium secondary battery of claim 1, wherein, in Formula 1, R is an alkylene group having 2 to 4 carbon atoms, and
$R_1$ is an alkyl group having 1 to 4 carbon atoms which is substituted with at least one fluorine.

4. The non-aqueous electrolyte solution for a lithium secondary battery of claim 3, wherein, in Formula 1, $R_1$ is an alkyl group having 1 to 3 carbon atoms which is substituted with at least one fluorine.

5. The non-aqueous electrolyte solution for a lithium secondary battery of claim 1, wherein the compound represented by Formula 1 is included in an amount of 0.5 wt % to 5 wt % based on the total weight of the non-aqueous electrolyte solution.

6. The non-aqueous electrolyte solution for a lithium secondary battery of claim 1, further comprising at least one second additive of a halogen-unsubstituted or substituted carbonate-based compound, a sultone-based compound, a sulfate-based compound, a phosphate-based or phosphite-based compound, a borate-based compound, a nitrile-based compound, an amine-based compound, a silane-based compound, or a lithium salt-based compound,
wherein the at least one second additive is included in an amount of 0.01 wt % to 50 wt % based on the total weight of the non-aqueous electrolyte solution.

7. A lithium secondary battery comprising:
a positive electrode comprising a positive electrode active material;
a negative electrode comprising a negative electrode active material;
a separator disposed between the negative electrode and the positive electrode; and
the non-aqueous electrolyte solution for a lithium secondary battery of claim 1.

8. The lithium secondary battery of claim 7, wherein the positive electrode active material comprises a lithium composite metal oxide comprising at least one of nickel (Ni), cobalt (Co), manganese (Mn), iron (Fe), or aluminum (Al).

9. The lithium secondary battery of claim 7, wherein the negative electrode active material comprises at least one of a carbon-based negative electrode active material or a silicon-based negative electrode active material.

* * * * *